May 22, 1962     O. RENNER ETAL     3,035,502
SHUTTER HOUSING FOR A CAMERA HAVING A CENTRAL SHUTTER
Filed July 5, 1960     2 Sheets-Sheet 1
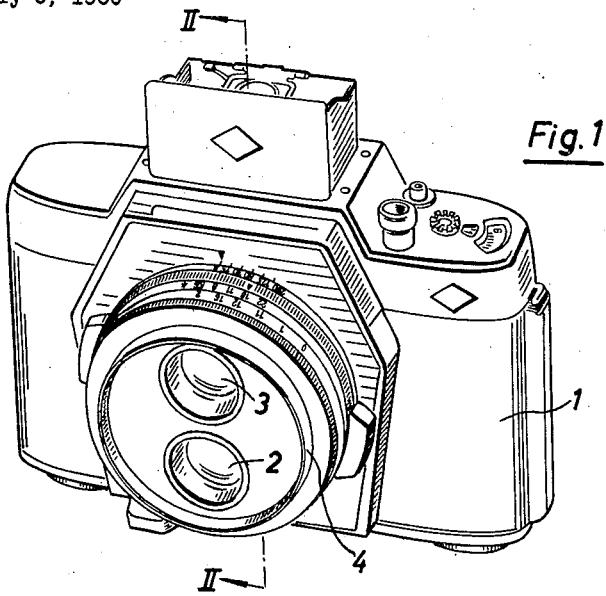
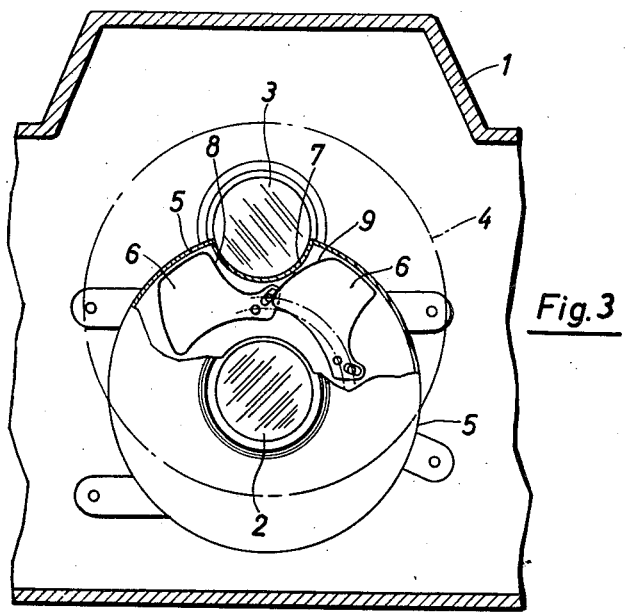
INVENTORS:
OTFRIED RENNER
KURT ZATTLER
BY Connolly and Hutz
ATTORNEYS

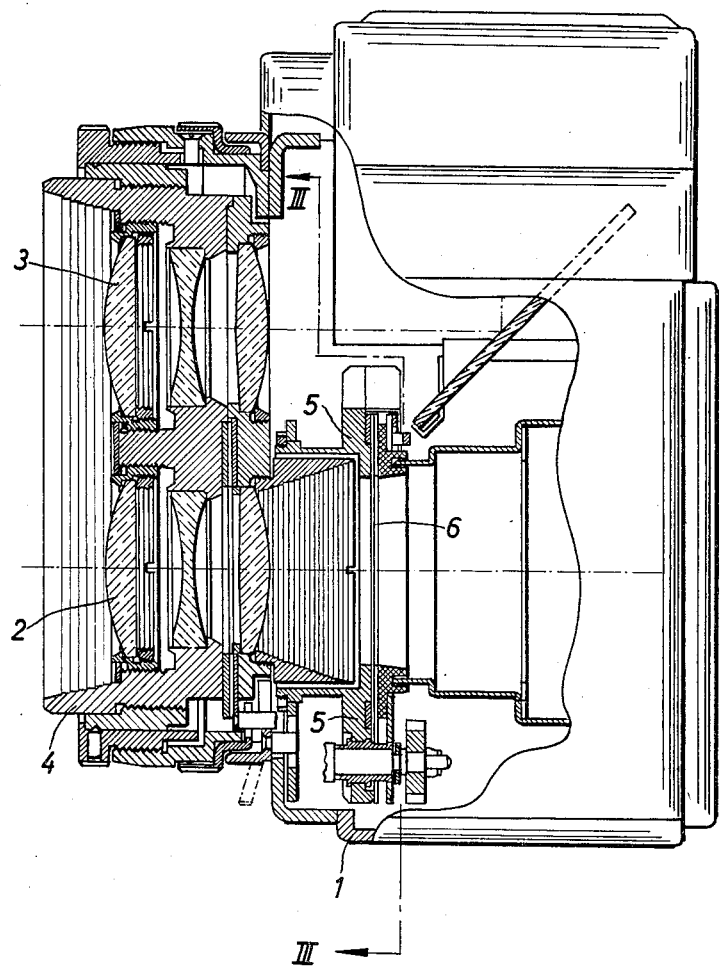

United States Patent Office 3,035,502
Patented May 22, 1962

3,035,502
SHUTTER HOUSING FOR A CAMERA HAVING A CENTRAL SHUTTER
Otfried Renner and Kurt Zattler, Munich, Germany, assignors to Agfa Aktiengesellschaft, Leverkusen-Bayerwerk, Germany, a corporation of Germany
Filed July 5, 1960, Ser. No. 40,908
Claims priority, application Germany July 7, 1959
4 Claims. (Cl. 95—63)

This invention relates to a shutter housing for a photographic camera having a central shutter, and it more particularly relates to a twin lens reflex camera of that type.

The shutter housings of existing cameras with central shutters have smooth outer surfaces which are mainly circularly shaped in cross section. This tends to make twin lens mirror reflex cameras having central shutters large, bulky and unwieldy because the focusing lens located above the objective lens must be displaced at a considerable distance from it to prevent the outer diameter of the shutter casing from obstructing its field of view and thereby vignetting the beam of focusing rays.

An object of this invention is to provide a shutter housing for a photographic camera having a central shutter which permits the camera to be made compact in form.

Another object is to provide such a shutter housing for a twin lens reflex camera.

In accordance with this invention the shutter housing incorporates an indentation which closely conforms to an indentation in the outer contour of a pair of opened shutter sectors. Various elements extending through the casing of the camera in the vicinity of the shutter housing are mounted within this indentation to make the camera casing more compact. In a twin lens mirror reflex camera, for example, the focusing lens is disposed within this indentation; and when the shutter housing is mounted in back of the focusing lens the focusing beam of rays within the camera is partially enclosed within this indentation. Furthermore, other parts of the camera can be mounted within this indentation, such as, coupling elements to the lens to minimize the overall size of this camera. The shutter housing is sealed to make it light-tight in the area of the indentation to preserve the light fastness of the operative interior of the camera.

This arrangement is particularly advantageous for twin lens mirror reflex cameras. It can be used to considerably reduce the relatively great distance between the objective lens and the focusing lens caused by the obstructing shutter housing of the ordinary circular type to make a miniature twin lens mirror reflex camera only slightly larger than other types of miniature cameras. This structure is also useful in other types of cameras for passing coupling members between the lenses and the range finder or similar elements through the free space created by this indentation which avoids the enlargement of the casing which ordinary forms of mounting require.

Novel features and advantages of the present invention will become apparent to one skilled in the art from a reading of the following description in conjunction with the accompanying drawings wherein similar reference characters refer to similar parts and in which:

FIG. 1 is a perspective view of a twin lens mirror reflex camera which is one embodiment of this invention;

FIG. 2 is a cross-sectional view taken through FIG. 1 along the line II—II; and

FIG. 3 is a cross-sectional view taken through FIG. 2 along the line III—III.

In FIGS. 1-3 the casing of the illustrated twin lens mirror reflex camera is designated by 1, the photographic objective lens by 2, the lens tube shared by these lenses by 4, and the shutter housing in back of the objective lens 2 by 5 as shown in FIGS. 2 and 3.

In FIG. 3 a pair of sectors 6 of a central shutter are shown in the opened condition in which adjacent outer contours 8 and 9 provide an indented area between them extending towards objective lens 2. Shutter housing 5 accordingly has indentation 7 which closely conforms to the aforementioned indented area between contours 8 and 9 of sector 6. This permits focusing lens 3 to be mounted within indentation 7 extremely close to objective lens 2. When shutter housing 5 is made in the ordinary circular form, focusing lens 3 must be arranged at a much greater distance from objective lens 2 to prevent vignetting of the focusing rays thereby considerably increasing the outer dimensions of the camera casing. Indentation 7 within shutter housing 5, therefore, makes it possible to mount focusing lens 3 extremely close to objective lens 2 without vignetting the focusing beam of light rays. Furthermore, the portion of indentation 7 which lies within the camera casing can be used for enclosing the focusing beam of rays passing within the camera from the focusing lens to the reflex mirror 10.

This indentation can also be utilized when the shutter is mounted in a diaphragm plane disposed between individual elements of the photographic objective lens 2. Furthermore, the free space provided by indentation 7 can be used in other types of cameras for passing coupling elements such as shafts and the like of lens controlling members into the camera casing, for example, for connection to a range finder or exposure meter which eliminates the extra space ordinarily required for these parts and permits the overall dimensions of the lens tube and camera casing to be remarkably minimized. Still further additional indentations 7 may be provided in the shutter housing at other positions where they can be favorably utilized in a similar manner for other purposes.

What is claimed is:

1. A shutter housing for a photographic camera incorporating an objective lens and a central shutter comprising movable sectors upon said camera which are constructed and arranged to provide an outer contour in the fully-opened condition defining an indented area extending towards said objective lens, said housing having an outer form which encompasses the path of travel of said shutter sectors, said housing incorporating an indentation which conforms with said indented area to provide a means for mounting elements in the casing of said camera outside of said shutter housing as close as possible to said objective lens, and a focusing lens mounted outside of said shutter housing and disposed within said indentation for minimizing the outer dimensions of said camera casing.

2. A camera as set forth in claim 1 wherein said objective lens is centrally disposed within said shutter housing, a lens tube is externally mounted in front of said camera casing, and said lens tube encloses said objective lens and said focusing lens.

3. A camera as set forth in claim 2 wherein said focusing lens is disposed above said objective lens.

4. A camera as set forth in claim 1 wherein said indentation partially encloses the beam of focusing rays passing from said focusing lens into the interior of said camera casing outside of said shutter housing.

References Cited in the file of this patent

UNITED STATES PATENTS 2,869,446    Franceschini  ---------- Jan. 20, 1959